(12) United States Patent
Norman et al.

(10) Patent No.: US 8,196,191 B2
(45) Date of Patent: Jun. 5, 2012

(54) COORDINATING CREDENTIALS ACROSS DISPARATE CREDENTIAL STORES

(76) Inventors: James M. Norman, Pleasant Grove, UT (US); Cameron Mashayekhi, Salt Lake City, UT (US); Karl E. Ford, Highland, UT (US)

( * ) Notice: Subject to any disclaimer, the term of this patent is extended or adjusted under 35 U.S.C. 154(b) by 831 days.

(21) Appl. No.: 11/893,780

(22) Filed: Aug. 17, 2007

(65) Prior Publication Data

US 2009/0049531 A1 Feb. 19, 2009

(51) Int. Cl.
*H04L 29/06* (2006.01)

(52) U.S. Cl. .............................................. 726/8; 726/18

(58) Field of Classification Search .................. 726/1, 2, 726/5–10, 18, 19
See application file for complete search history.

(56) References Cited

U.S. PATENT DOCUMENTS

| | | | |
|---|---|---|---|
| 6,006,018 A | 12/1999 | Burnett et al. | |
| 6,067,623 A | 5/2000 | Blakley, III et al. | |
| 6,182,229 B1 | 1/2001 | Nielson | |
| 6,615,253 B1 | 9/2003 | Bowman-Amuah | |
| 6,651,168 B1 | 11/2003 | Kao et al. | |
| 6,779,117 B1 | 8/2004 | Wells | |
| 6,779,155 B1 | 8/2004 | Bahrs et al. | |
| 6,971,005 B1 | 11/2005 | Henry et al. | |
| 7,058,180 B2 | 6/2006 | Ferchichi et al. | |
| 7,076,795 B2 | 7/2006 | Hahn | |
| 7,107,310 B2 | 9/2006 | McCarthy | |
| 7,107,610 B2 | 9/2006 | Lortz | |
| 7,137,006 B1 | 11/2006 | Grandcolas et al. | |
| 7,275,259 B2 | 9/2007 | Jamieson et al. | |
| 7,310,734 B2 | 12/2007 | Boate et al. | |
| 7,496,953 B2 | 2/2009 | Andreev et al. | |
| 7,552,222 B2 | 6/2009 | Garimella et al. | |
| 7,562,113 B2 | 7/2009 | Labarge et al. | |
| 7,634,803 B2 | 12/2009 | Birk et al. | |
| 7,644,086 B2 | 1/2010 | Boozer et al. | |
| 7,703,128 B2 | 4/2010 | Cross et al. | |
| 7,788,497 B2 | 8/2010 | Luo et al. | |
| 2002/0046064 A1* | 4/2002 | Maury et al. | 705/4 |
| 2003/0012382 A1 | 1/2003 | Ferchichi et al. | |
| 2003/0195970 A1 | 10/2003 | Dinh et al. | |
| 2004/0083238 A1* | 4/2004 | Louis et al. | 707/200 |
| 2004/0260953 A1 | 12/2004 | Jamieson et al. | |

(Continued)

OTHER PUBLICATIONS

Novell, Inc. "Common Authentication Service Adapter (CASA)," Novell Developer Kit, www.novell.com, Nov. 18, 2005, 55 pps.

(Continued)

*Primary Examiner* — Gilberto Barron, Jr.
*Assistant Examiner* — Malcolm Cribbs
(74) *Attorney, Agent, or Firm* — King & Schickli, PLLC (57) ABSTRACT

Apparatus and methods are described for coordinating user credentials across multiple disparate credential stores. A synchronizing engine requests and receives past and present credential information from the disparate credential stores. Users indicate which, if any, of the credential information they desire to synch together. Upon common formatting of the credential information, comparisons reveal whether differences exist between the past and present versions. If differences exist, the information is updated. In this manner, users link together various passwords, keys or other secrets to maintain convenience from a single point of control, such as in a single-sign-on (SSO) environment, regardless of the disparateness of the stores. The reverse is also possible such that linked credentials are accessible from the multiple stores. Retrofitting existing SSO services is another feature as are computer program products and computing network interaction. User or enterprise policies are also used in governing these credentials.

25 Claims, 4 Drawing Sheets

U.S. PATENT DOCUMENTS

| | | | |
|---|---|---|---|
| 2005/0005094 | A1 | 1/2005 | Jamieson et al. |
| 2005/0081055 | A1 | 4/2005 | Patrick et al. |
| 2005/0097166 | A1 | 5/2005 | Patrick et al. |
| 2005/0097352 | A1 | 5/2005 | Patrick et al. |
| 2005/0144482 | A1 | 6/2005 | Anuszewski |
| 2005/0171872 | A1* | 8/2005 | Burch et al. ............ 705/29 |
| 2005/0268307 | A1* | 12/2005 | Gates et al. ............ 719/315 |
| 2005/0289341 | A1 | 12/2005 | Ritola et al. |
| 2005/0289644 | A1 | 12/2005 | Wray |
| 2006/0013393 | A1 | 1/2006 | Ferchichi et al. |
| 2006/0037066 | A1 | 2/2006 | Audebert |
| 2006/0047625 | A1* | 3/2006 | Ho et al. ............ 707/2 |
| 2006/0075224 | A1 | 4/2006 | Tao |
| 2006/0080352 | A1 | 4/2006 | Boubez et al. |
| 2006/0218630 | A1 | 9/2006 | Pearson et al. |
| 2006/0235935 | A1 | 10/2006 | Ng |
| 2006/0248577 | A1 | 11/2006 | Beghian et al. |
| 2007/0006291 | A1 | 1/2007 | Barari et al. |
| 2007/0143829 | A1 | 6/2007 | Hinton et al. |
| 2007/0157296 | A1 | 7/2007 | Lioy |
| 2007/0220268 | A1 | 9/2007 | Krishnaprasad et al. |
| 2007/0283425 | A1 | 12/2007 | Ture et al. |
| 2008/0016232 | A1 | 1/2008 | Yared et al. |
| 2008/0021997 | A1 | 1/2008 | Hinton |
| 2008/0059804 | A1 | 3/2008 | Shah et al. |
| 2008/0072320 | A1 | 3/2008 | Hurley |
| 2008/0077809 | A1 | 3/2008 | Hayler et al. |
| 2008/0092215 | A1 | 4/2008 | Soukup et al. |
| 2008/0104411 | A1 | 5/2008 | Agrawal et al. |
| 2008/0184349 | A1* | 7/2008 | Ting ............ 726/7 |
| 2008/0196090 | A1 | 8/2008 | Baron et al. |
| 2008/0263365 | A1 | 10/2008 | Aupperle et al. |
| 2008/0276309 | A1 | 11/2008 | Edelman |
| 2008/0301784 | A1 | 12/2008 | Zhu et al. |
| 2008/0320576 | A1 | 12/2008 | Curling |
| 2009/0007248 | A1 | 1/2009 | Kovaleski |
| 2009/0013395 | A1 | 1/2009 | Marcus et al. |
| 2009/0320118 | A1 | 12/2009 | Muller et al. |

OTHER PUBLICATIONS

Bandit, "Common Authentication Service Adapter (CASA) Architecture," www.bandit-project.org/index.php/Common_Authentication_Services_Adapter_%28CASA%29_Architecture, Jul. 19, 2007, 4 pps.

Bandit, "Roadmap," www.bandit-project.org/index.php/Roadmap, 6 pps.

Bandit, "Common Authentication Service Adapter (CASA) Architecture," www.bandit-project.org./index.php?title=Common_Authentication_Services_Adapter_%28CASA%29_Architecture&diff=3826&oldid=2955, Jul. 19, 2007, 4 pps.

Bandit, "Common Authentication Service Adapter (CASA) Architecture," www.bandit-project.org/index.php?title=Common_Authentication_Services_Adapter_%28CASA%29_Architecture&diff=3826&oldid=1822, Aug. 17, 2007, 5 pps.

Bandit, "Common Authentication Service Adapter (CASA) Architecture," /www.bandit-project.org/index.php?title=Common_Authentication_Services_Adapter_%28CASA%29_Architecture&action=history, Jul. 19, 2007, 2 pps.

USPTO Office Action dated Oct. 13, 2010 for U.S. Appl. No. 11/897,737, 11 pgs.

USPTO Office Action dated Dec. 22, 2010 for U.S. Appl. No. 12/036,596, 29 pgs.

USPTO Office Action dated Dec. 14, 2010 for U.S. Appl. No. 12/023,401, 19 pgs.

USPTO Office Action dated Mar. 17, 2011 for U.S. Appl. No. 11/897,737, 12 pgs.

USPTO Office Action dated Feb. 22, 2011 for U.S. Appl. No. 11/901,397, 22 pgs.

USPTO Office Action dated May 25, 2011 for U.S. Appl. No. 12/036,596.

USPTO Office Action dated Sep. 2, 2010 for U.S. Appl. No. 11/893,780.

USPTO Office Action dated Jan. 7, 2011 for U.S. Appl. No. 11/893,780.

USPTO Office Action dated Feb. 22, 2011 for U.S. Appl. No. 11/901,397.

Microsoft, "Find and Replace," Microsoft Office Word 2003, Screenshot, printed Aug. 11, 2007 1 page.

Free Download Center, "Find and Replace Tool for Word 1.0 screenshot," www.freedownloancenter.com/Utilities/Misc Text Editing Tools/Find and . . . Aug. 29, 2007 1 page.

Microsoft, "Find and Replace", Microsoft Office Word 2003, Screenshot, printed Sep. 17, 2007, 1 page.

Free Download Center, "Finda and Replace Tool for Word 1.0 screenshot", www.freedownloadcenter.com/Utilities/Misc_Text_Editing_Tools/Find_and . . . , Sep. 17, 2007 1 page.

U.S. Appl. No. 11/901,397 Sep. 17, 2010 Office Action.

\* cited by examiner

COORDINATING CREDENTIALS ACROSS DISPARATE CREDENTIAL STORES

FIELD OF THE INVENTION

Generally, the present invention relates to computing environments involving heterogeneous credential stores with disparate credential information. Particularly, it relates to coordinating the disparateness of the stores into harmonized versions to provide management from a single point of control. In this manner, users can link together various passwords, keys or other secrets to maintain convenience in environments, such as single-sign-on (SSO) environments, regardless of the disparateness of the stores. Various features relate to computer program products, systems for same and methods. User or enterprise policies useful in governing these credentials and computing interaction, to name a few, are other noteworthy features.

BACKGROUND OF THE INVENTION

Newer computer operating systems such as Linux, Windows XP, or Windows Vista provide multiple credential stores for network client applications' usage. These credential stores usually are utilized to provide mechanisms for applications to store credentials for the user, and retrieve them later to provide a single-sign-on (SSO) experience. More famous of these credential stores by name are: Firefox password manager, Gnome Keyring, KDE Wallet, Windows Passport, CASA, SecretStore etc.

Applications, based on their needs or at the time of their development, are closely integrated with a particular credential store. This is due to applications utilizing different credential stores and different types. As a result, there is a need for a single point of administration and access for the user. Currently, however, users must launch different management utilities for each store to manage their credentials. There are presently no tools available to provide the ability to copy, move, or "link" credentials among different versions of the same applications or multiple applications sharing the same credential. To allow credentials to be available for use and management in different stores, currently you have to manually create, copy, or delete them from one store to another. Intuitively, this is inconvenient and impractical.

Also, it presently exists that each credential store has proprietary interests in only offering solutions focused on their store and not interoperability with other stores, thereby avoiding ease of use for end users.

In view of these various problems, there is need in the art of credential stores to provide a mechanism to synchronize the values of credentials between stores, thereby eliminating the need for manually maintaining credentials in multiple stores. In that many computing configurations already have existing SSO technology, it is further desirable to leverage existing configurations by way of retrofit technology, thereby avoiding the costs of providing wholly new products. Taking advantage of existing frameworks, such as the CASA (Common Authentication Service Adapter), software offering by Novell, Inc., the common assignee of this invention, is another feature that optimizes existing resources. Any improvements along such lines should further contemplate good engineering practices, such as automation, relative inexpensiveness, stability, ease of implementation, low complexity, flexibility, etc.

SUMMARY OF THE INVENTION

The foregoing and other problems become solved by applying the principles and teachings associated with the hereinafter-described coordinating credentials across disparate credential stores. At a high level, methods and apparatus are provided that allow linking of credentials amongst different stores and provides access to them through a utility that provides for a single point of access and management. As an important byproduct of this unique linking feature, the reverse is possible such that linked credentials are accessible from multiple stores while they are synchronized at all times. This is contemplated to be particularly useful when there are multiple versions of the same application such as a web based, command line, GUI, and perhaps older and newer versions that might have different methods of storing credentials in different stores. Linking will provide the ability to manage from a single point as well as synchronization of credentials regardless of credential store of origin. It also provides a mechanism to synchronize the values of credentials between stores, eliminating the need for manually maintaining credentials in multiple stores by the user. The user simply changes one value in a given credential and all linked or synchronized values will be updated automatically. In addition, policies can be applied to expand or filter credential availability across different stores.

In more detail, a synchronizing engine requests and receives past and present credential information from the disparate credential stores. Users indicate which, if any, of the credential information they desire to synch together. Upon common formatting of the credential information, comparisons reveal whether differences exist between the past and present versions. If differences exist, the information is updated. In this manner, users link together various passwords, keys, or other secrets to maintain convenience from a single point of control, such as in a single-sign-on (SSO) environment, regardless of the disparateness of the stores. Retrofitting existing SSO services is another feature as are computer program products and computing network interaction. User or enterprise policies are used in making various determinations.

In at least one embodiment, coordinating credentials amongst disparate stores includes requesting and receiving credential information through a common interface and in a common format. Computing first and later hashes of the credential information is used to determine if changes exist. If the hashes do not match, various user credentials are updated. Users indicate the credentials for synchronizing such as by symbolically linking two or more passwords together, the passwords being associated with the disparate credential stores.

The invention achieves, among other things: linking together various passwords, keys or other secrets to provide credential management from a single point of control, such as in a single-sign-on (SSO) environment, regardless of the disparateness of the stores; proving the reverse embodiment such that linked credentials are accessible from multiple stores; retrofitting existing SSO services; and governing by way of user or enterprise policy.

In a computing system environment, the invention may be practiced with: a user interface module for indicating various credentials to be synchronized with one another (such as by way of a CASA manager); a single-sign-on service; a synchronizing engine interfacing with the single-sign-on service; and at least two credential stores having similar or dissimilar credential information. During use, the synchronizing engine receives the credential information in a common format and is configured to compare past and present versions of the credential information to ascertain whether differences exist. In the event differences exist, the synchronizing engine is configured to update the various credentials indicated by a user via the user interface module. Computing devices of the computing environment can be physical or virtual machine(s).

Computer program products are also disclosed. For instance, a product available as a download or on a computer readable medium has components to: request and receive versions of credential information for at least two multiple disparate credential stores; commonly format the versions; and receive user input indicating various user credentials desirable to be synchronized together in the event the versions of the credential information have differences. User or enterprise policies are also used in governance of the credentials.

The CASA architecture is also exploited as part of the invention to leverage existing resources.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention: In accordance with the present invention, methods and apparatus for coordinating credentials across disparate credential stores are hereinafter described.

Figure 1:
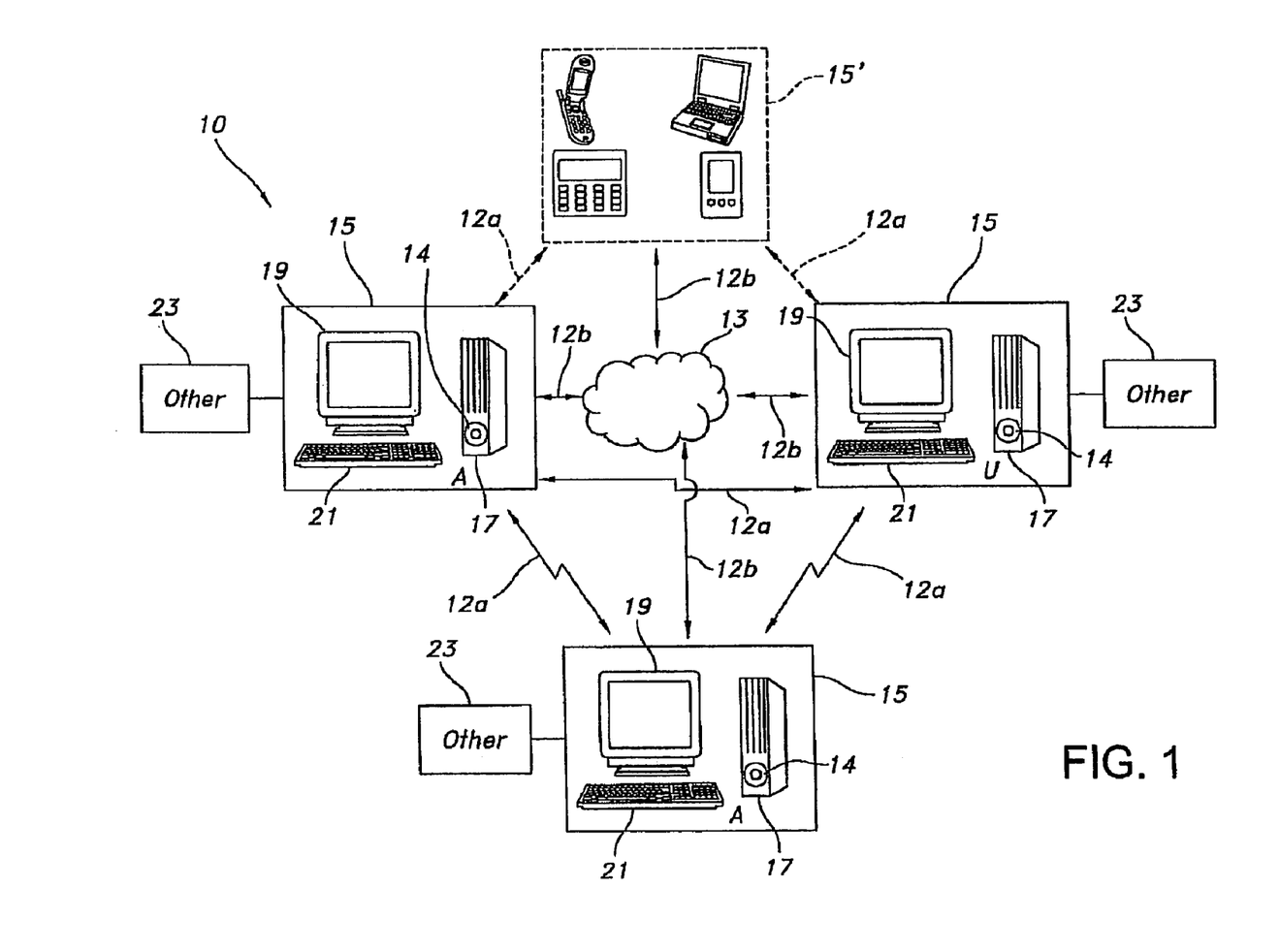
FIG. 1 is a diagrammatic view in accordance with the present invention of a representative computing environment for coordinating credentials across disparate credential stores.

With reference to FIG. 1, a representative computing environment 10 for coordinating credentials occurs by way of one or more computing devices 15 or 15' arranged as individual or networked physical or virtual machines. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone, or the like. The other items may also be stand alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download or any available tangible media, such as RAM, ROM, EEPROM, CD-ROM, DVD, or other optical disk storage devices, magnetic disk storage devices, floppy disks, or any other tangible medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
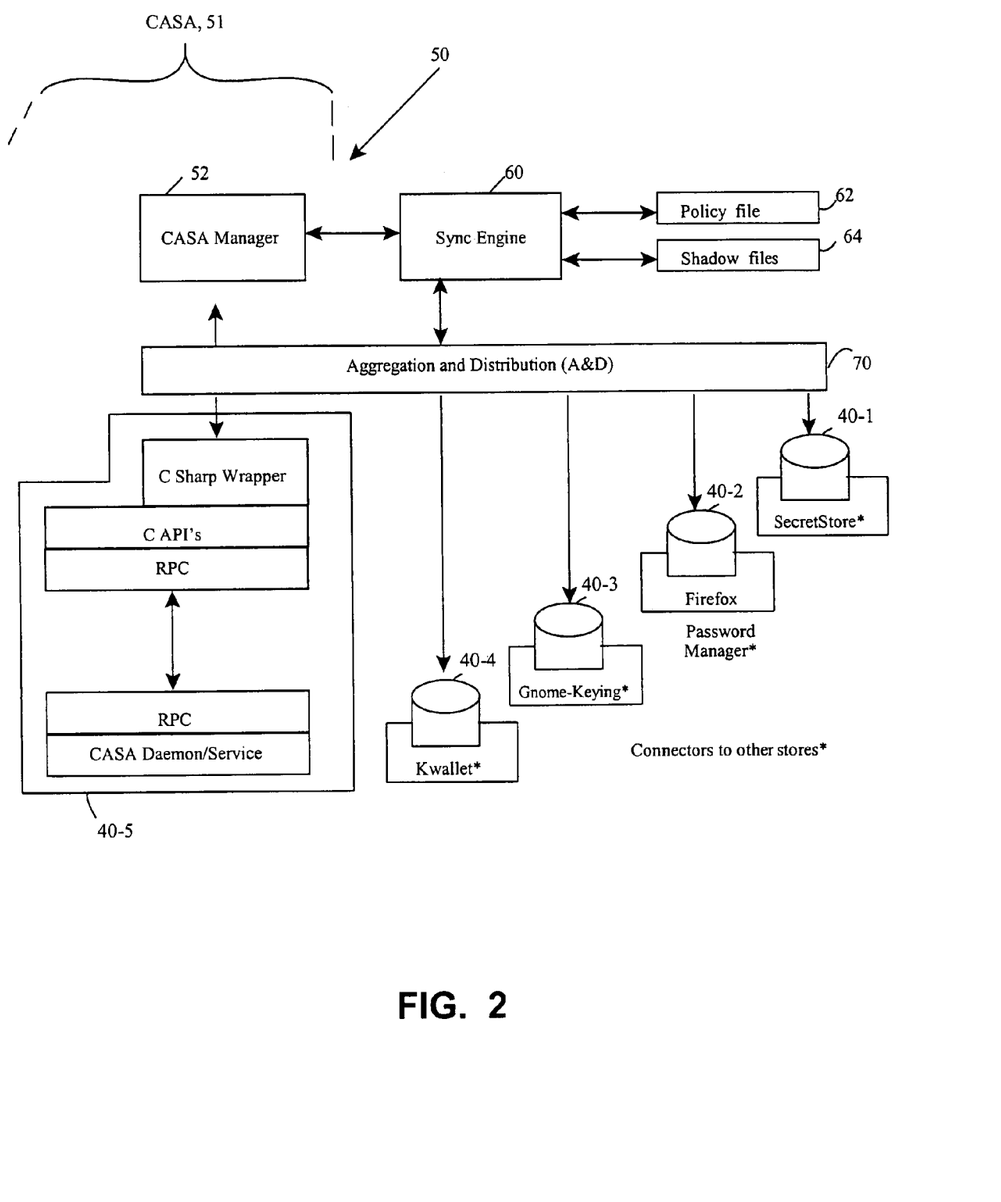
FIG. 2 is a diagrammatic view in accordance with the present invention of a more detailed representative computing environment for coordinating credentials across disparate credential stores.
Figure 3:
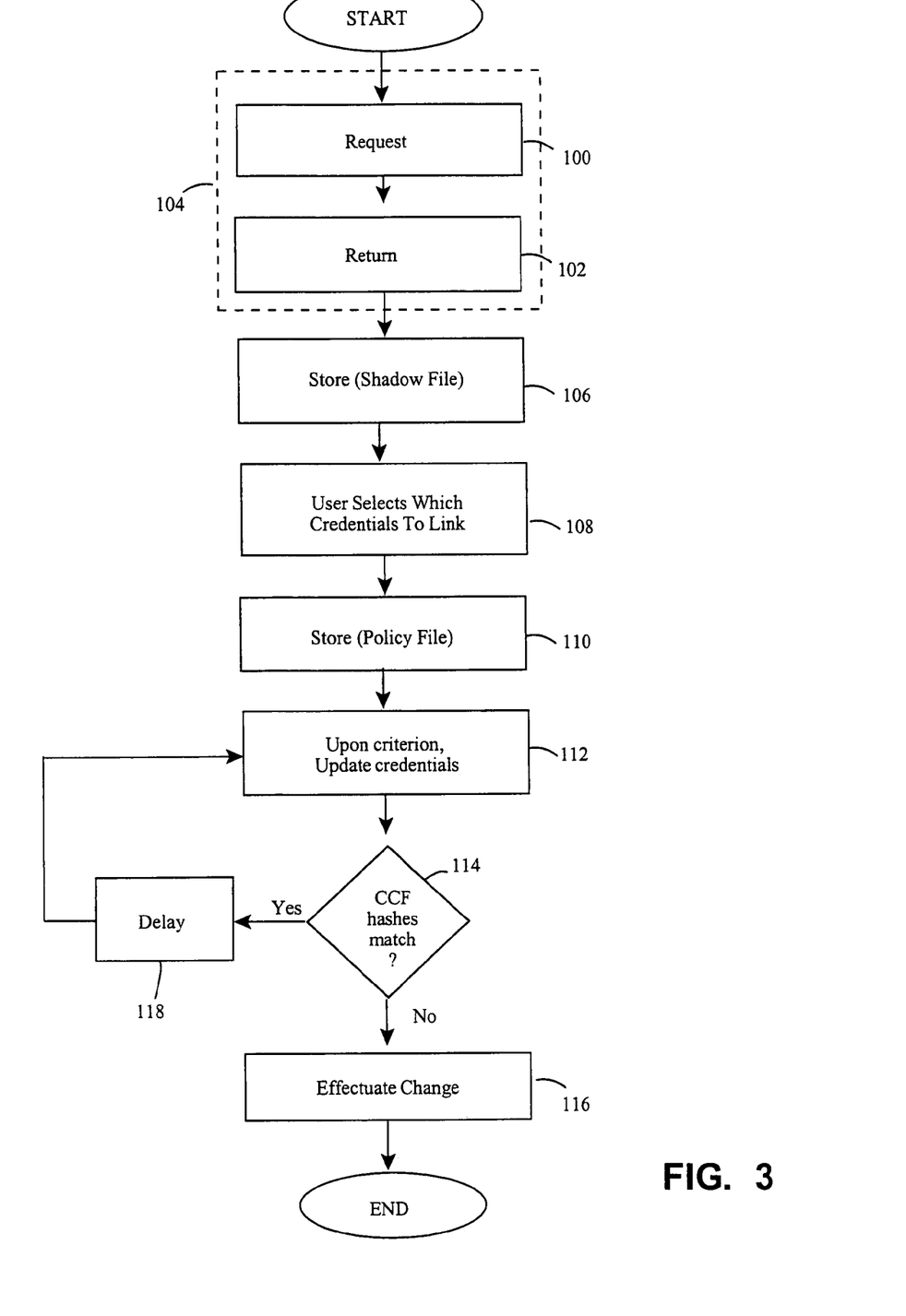
FIG. 3 is a high-level flow chart in accordance with the present invention for coordinating credentials across disparate credential stores.

With the foregoing representative computing environment as backdrop, FIGS. 2 and 3 show a high-level architecture and overall flow of the invention. That is, a plurality of disparate credential stores 40-1, 40-2, 40-3, 40-4, 40-5 have dissimilar credential information, such as keys, passwords, or other secrets, based primarily on the propriety nature of the store. Representatively, the stores include, but are not limited to, SecretStore, Firefox Password Manager, Gnome Keyring, KDE Wallet and miCASA, respectively. A single-sign-on service 50 in the computing environment consists of one or more existing applications that are useful to the user for enjoying SSO convenience from one or more computing devices. In that the disparateness of the stores 40 tends to complicate SSO, especially considering that credential information is updated over time, is inconsistent in form or storage from one store to the next, has little if any commonality amongst the stores, etc., the invention further includes a synchronizing engine 60 (with attendant files 62, 64) and a layer 70 intermediate the stores 40 and the synchronizing engine. During use, users indicate which, if any, of the credential information they desire to synch together and, upon common formatting of the credential information by way of the synch engine 60 and layer 70, all linked or synchronized information is updated automatically.

In more detail, Novell Inc.'s CASA brand software (Common Authentication Services Adapter) 51 is a common authentication and security package that provides a set of libraries for application and service developers to enable single sign-on for an enterprise network. Version 1.7, for example, provides a local, session-based credential store (called miCASA) that is populated with desktop and network login credentials, given generically as 40-5. A CASA manager 52 serves as user interface module, such as on monitor 19 (FIG. 1), whereby users can undertake the linking of credentials of the various stores 40.

Currently, CASA manager contains drivers/connectors to the credential stores 40. Upon request, each of these drivers return an enumeration of credentials through a common interface and in a common format, steps 100 and 102. (Together, this is referred to as a Common Credential Format (CCF), step 104.) In a representative embodiment, the format is an XML schema and each driver produces an XML document describing the credential information of the stores 40. So that the CASA manager 52 and the stores 40 have format commonality, the layer 70 is configured there between. Otherwise, the CASA manager interfaces with users as normal and the credential stores keep their own proprietary format.

Upon the return, one embodiment of the invention contemplates storing the credential information as a shadow file 64, step 106. A hash of the credential information occurs at this time and is likewise stored with the shadow file. The user, through the CASA Manager, can then select the various credentials they wish to link together or synchronize, step 108. In one embodiment, this is referred to as a symbolic link and is stored in the policy file 62, step 110, for use by the synchronizing engine.

Figure 4:
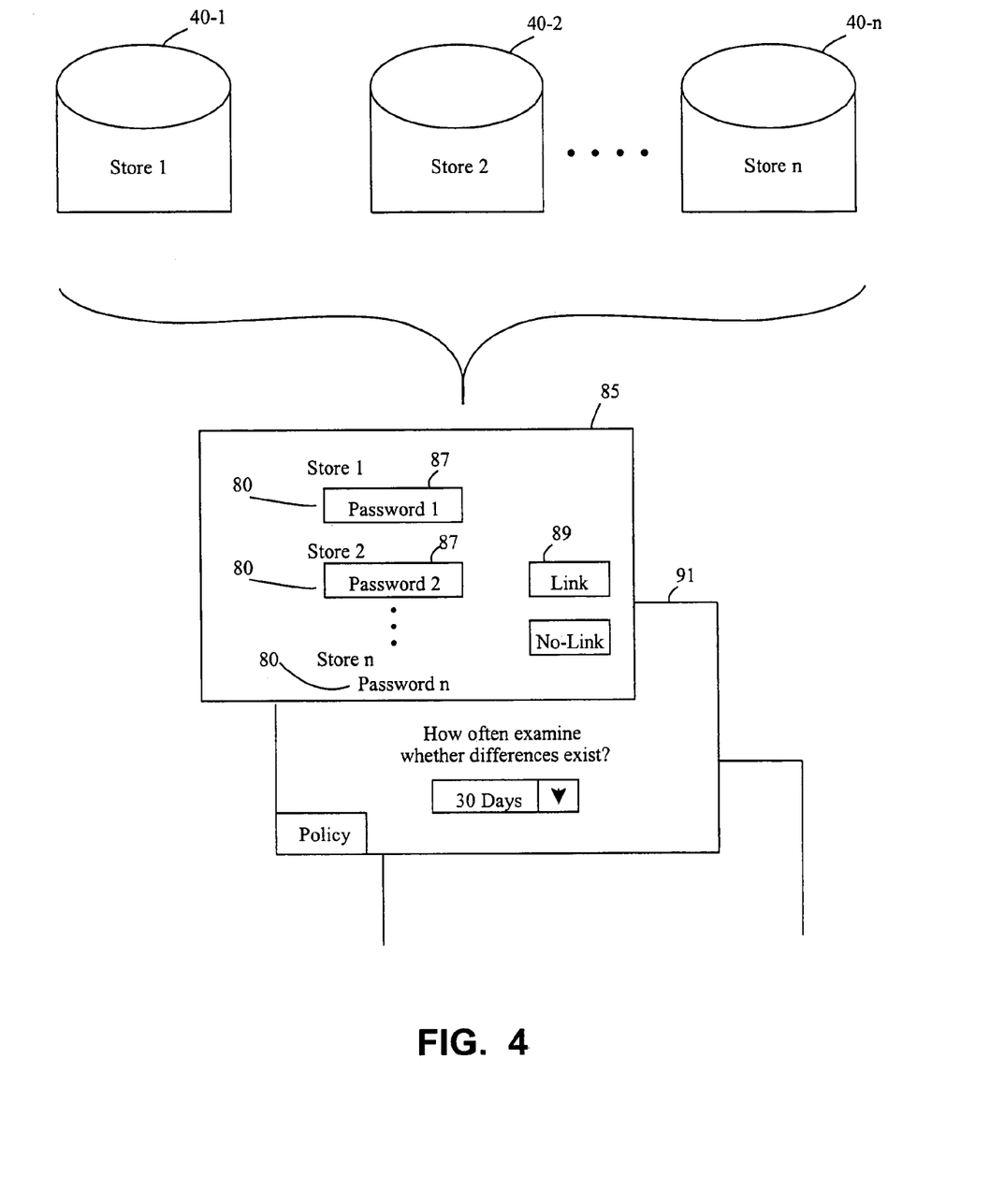
FIG. 4 is a representative diagrammatic view in accordance with the present invention for establishing policy or linking credentials of disparate credential stores.

Diagrammatically, FIG. 4 shows various credential stores 40-1, 40-2, . . . 40-*n*, returning various credential information 80, such as Password 1, Password 2, . . . Password n, to the user interface module, such as per screen shots or web pages 85 on a monitor of a computing device. In turn, the user selects which of the credentials 80 they desire to synch together. In this case, each of Password 1 and Password 2 are selected, such as by a highlighting box 87, and are linked by clicking on a dedicated linking icon button 89. Of course, those skilled in the art will recognize other techniques for linking credential information of the various stores together.

Returning to FIGS. 2 and 3, upon reaching a criterion, such as a configured interval or based on some trigger policy, the synchronizing engine 60 updates the earlier version of credentials, step 112, by requesting and receiving a new CCF document from each driver. It computes a new hash for the latest or updated version and compares it to the hash earlier-stored in the shadow file(s). If the hashes match, the credential information remains accurate and no further updating is necessary, other than to delay for some pre-defined period, step 118, and repeat the process, e.g., steps 112, and 114. On the other hand, if the hashes do not match, changes are effectuated at step 116. In a representative embodiment, change effectuation consists of the sync engine 60 comparing the CCF documents of the current request with the shadow request. Based on policy, changes are then made either to the shadow file, the target store, or both. The sync engine also queries the symbolic link information file for linked credential keys. If needed, changes to the linked shadow files are propagated to the appropriate store.

For instance, if a user or enterprise policy requires a user to update their single-sign-on password every, 30 days, such as per 91, FIG. 4, and the user's password for their Firefox account has not changed, the foregoing allows the inquiry to examine when and if the passwords for the SSO and Firefox are different. If different, the invention recognizes it and effectuates an invisible change to the user such that they can still enjoy a SSO experience, without needing to go back to their Firefox account and change their password, and login credentials to match their SSO password. In other words, the present invention recognizes that users often desire to keep many passwords updated together, without actually having to undertake the work necessary to keep them updated, and accomplishes the change for the individual automatically.

For example, Firefox stores a credential as a username and a password for services requiring authentication. Often, other applications using the same username and password for authentication store that information as a cn (common name) and a pin. The user will recognize that the password saved by Firefox is the same information saved as the pin by another application in a different store. This invention allows the user to link or synchronize the password saved by Firefox with the pin saved by the other application. Hence, when the password changes so does the pin.

In the alternative, however, it should be appreciated that users may want to avoid any linking whatsoever of credential information and so a mechanism, such as default condition of no-linking (absent an affirmative indication of linking) or a no-linking icon button 93, FIG. 4, can be used in certain instances. In this manner, credentials can be kept strictly isolated if desired.

In the case of conflicts, resolution can be accomplished by the policy the user sets up while creating a link between two or more credential keys. In this regard, the policy might be to treat a particular store as Master and another as a Servant, to select a hierarchy of stores having priority over other stores, or to let the user resolve the conflict manually using an Administration or other tool. The policy may also be a time frame, a security measure, combinations thereof, or any hereinafter contemplated feature useful in defining conditions on the linking.

In any embodiment, certain advantages and benefits over the prior art should be readily apparent. For example, but not limited to, the invention provides advantage over the art according to: 1) the ability to link and synchronize credentials across multiple stores according to application(s) of policy; 2) providing an "umbrella service" giving users a single point of use, management, and administration for multiple credential stores. (Compared to the prior art, others focus on proprietary solutions, not interoperability between stores.); 3) overcoming complexity in the working environment of standard operating systems. (An illustration of this relates to current Linux distributions that, by default, provide the two popular choices of desktops (Gnome, and KDE) and each come with its own credential store and the applications that use one or the other, but not both. Now users can utilize the instant invention and use all effectively.) Appreciating complexity in computing environments, other expansions to the invention include, but are not limited to: adding peer-to-peer linking and synchronization capability for users to synchronize their multiple desktops (e.g., peer-to-peer Windows brand workstations linked to peer-to-peer Linux desktops, or vice versa); or having linking capability between clients and servers (e.g., linking desktop credential store(s) to eDirectory Secret-Store); and 4) the ability to apply uniform policy across disparate stores through a single point of management.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of coordinating user credentials across multiple disparate credential stores, comprising:
   determining credential information for at least two of said multiple disparate credential stores;
   commonly formatting said credential information for displaying to a user via a common interface, without altering a format of said credential information in the at least two said multiple disparate credential stores;
   by the user, indicating via the common interface various user credentials of the commonly formatted said credential information for synchronizing;
   by the user, linking via the common interface at least a portion of the various user credentials of the at least two of said multiple disparate credential stores indicated for synchronizing;
   determining updated credential information for the at least two of said multiple disparate credential stores;
   commonly formatting said updated credential information; and
   if the updated credential information and the credential information differ, updating the various linked user credentials of the at least two of said multiple disparate credential stores with the received updated credential information.

2. The method of claim 1, further including comparing a first hash of the commonly formatted said credential information to a second hash of the commonly formatted said updated credential information when determining said differences.

3. The method of claim 2, further including storing the first hash or second hash in a shadow file.

4. The method of claim 1, wherein the indicating various user credentials for synchronizing further includes symbolically linking two or more passwords together, the passwords being associated with the at least two of said multiple disparate credential stores.

5. The method of claim 1, further including establishing a policy for when the determining updated credential information for the at least two of said multiple disparate credential stores occurs.

6. The method of claim 1, further including retrofitting an existing single-sign-on service with a synchronizing engine to manage the updating.

7. The method of claim 1, further including indicating various user credentials for no-synchronizing.

8. The method of claim 1, wherein the updating the various user credentials further includes synchronizing a first password of a first of the at least two of said multiple disparate credential stores to a second password of a second of the at least two of said multiple disparate credential stores.

9. In a computing system environment, a method of coordinating user credentials across multiple disparate credential stores, comprising:
   requesting credential information for at least two of said multiple disparate credential stores;
   receiving the requested credential information through a common interface and in a common format, said common format being displayed to a user via the common interface without altering a format of the requested credential information in the at least two of said multiple disparate credential stores;
   computing a first hash for the received credential information;
   by the user, linking via the common interface at least a portion of the received credential information for the at least two of said multiple disparate credential stores;
   requesting updated credential information for the at least two of said multiple disparate credential stores;
   receiving the updated credential information through the common interface and in the common format;
   computing a second hash for the received updated credential information; and
   if the second hash does not match the first hash, updating the various linked user credentials for the at least two of said multiple disparate credential stores with the received updated credential information.

10. The method of claim 9, wherein the requesting updated credential information occurs upon a criterion of an established policy.

11. The method of claim 9, further including providing a synchronizing engine to interface with a single-sign-on service, the synchronizing engine for the requesting and receiving the credential information and the updated credential information.

12. The method of claim 11, further including interfacing the synchronizing engine and the single-sign-on service with a layer intermediate the multiple disparate credential stores.

13. The method of claim 9, further including indicating the various user credentials to be updated.

14. The method of claim 13, wherein the indicating further includes symbolically linking two or more passwords together, the passwords being associated with the at least two of said multiple disparate credential stores.

15. A non-transitory computer program product available as a download or on a computer readable medium having executable instructions for coordinating user credentials across multiple disparate credential stores, comprising:
   a first component for requesting and receiving credential information for at least two of said multiple disparate credential stores and, thereafter, updated credential information for the at least two of said multiple disparate credential stores;
   a second component to commonly format the credential information and the updated credential information for the at least two of said multiple disparate credential stores, the second component performing the step of commonly formatting for display to a user without altering a format of the credential information and the updated credential information in the at least two of said multiple disparate credential stores;
   a third component to receive user input indicating various user credentials of the requested and received credential information desired to be linked and to be synchronized together in the event the requested and received credential information and the updated credential information have differences; and a fourth component for determining whether the credential information and the updated credential information actually have said differences.

16. The computer program product of claim 15, wherein one or more of the components reside with a synchronizing engine for retrofitting with an existing single-sign-on service.

17. The computer program product of claim 15, further including a fifth component for storing a policy, the fourth and fifth components in communication with one another so that the determining said differences between the credential information and the updated credential information occurs according to the policy.

18. A computing system for coordinating user credentials across multiple disparate credential stores, comprising:

a user interface module for indicating by a user various credentials to be synchronized with one another;

a single-sign-on service;

a synchronizing engine interfacing with the single-sign-on service; and at least two credential stores of the multiple disparate credential stores having dissimilar credential information, wherein the synchronizing engine receives the dissimilar credential information in a common format without altering a format of the dissimilar credential information in the multiple disparate credential stores and is configured to link at least a portion of the dissimilar credential information from the multiple disparate credential stores and to compare past and present versions of the dissimilar credential information to ascertain whether differences exist, in the event differences exist, the synchronizing engine being configured to update the various linked credentials indicated by a user via the user interface module.

19. The computing system of claim 18, further including a variety of files accessible by the synchronizing engine to ascertain user or enterprise policies.

20. The computing system of claim 18, further including an aggregation and distribution layer intermediate the at least two credential stores and the synchronizing engine.

21. The computing system of claim 18, wherein the user interface module is a CASA manager.

22. The computing system of claim 18, wherein the at least two credential stores include one or more of a Firefox password manager, Gnome Keyring, KDE Wallet, Windows Passport, CASA store, and SecretStore.

23. The computing system of claim 18, further including a driver for retrieving the credential information from the at least two credential stores.

24. The computing system of claim 18, wherein the synchronizing engine is a non-transitory computer program product available as a download or on a computer readable medium having executable instructions for installation on one or more physical computing devices.

25. The computing system of claim 18, wherein the synchronizing engine is further configured to apply uniform policy across the at least two credential stores.

* * * * *